United States Patent
Chuang

(10) Patent No.: US 9,690,596 B1
(45) Date of Patent: Jun. 27, 2017

(54) FIRMWARE BASED RUNTIME OPERATING SYSTEM SWITCH

(71) Applicant: Phoenix Technologies Ltd., Campbell, CA (US)

(72) Inventor: Franklin Chuang, New Taipei (TW)

(73) Assignee: Phoenix Technologies Ltd., Campbell, CA (US)

( * ) Notice: Subject to any disclaimer, the term of this patent is extended or adjusted under 35 U.S.C. 154(b) by 47 days.

(21) Appl. No.: 14/843,834

(22) Filed: Sep. 2, 2015

Related U.S. Application Data

(60) Provisional application No. 62/044,756, filed on Sep. 2, 2014.

(51) Int. Cl.
  *G06F 9/44* (2006.01)
  *G06F 9/48* (2006.01)

(52) U.S. Cl.
  CPC ............ *G06F 9/441* (2013.01); *G06F 9/4418* (2013.01); *G06F 9/4843* (2013.01)

(58) Field of Classification Search
  CPC ....... G06F 9/441; G06F 9/4418; G06F 9/4813
  See application file for complete search history.

(56) References Cited

U.S. PATENT DOCUMENTS

| 7,831,850 | B2 * | 11/2010 | LeProwse | G06F 9/441 713/1 |
| 9,354,942 | B2 * | 5/2016 | Rutledge | G06F 1/3287 |
| 2003/0229806 | A1 * | 12/2003 | Piel | G06F 1/3203 726/34 |
| 2008/0177994 | A1 * | 7/2008 | Mayer | G06F 9/4418 713/2 |
| 2009/0063845 | A1 * | 3/2009 | Lin | G06F 1/3203 713/100 |
| 2010/0122077 | A1 * | 5/2010 | Durham | G06F 1/3203 713/100 |
| 2012/0191961 | A1 * | 7/2012 | Wu | G06F 1/3275 713/2 |
| 2013/0346780 | A1 * | 12/2013 | Hara | G06F 1/32 713/323 |
| 2014/0115308 | A1 * | 4/2014 | Li | G06F 9/4406 713/1 |

(Continued)

OTHER PUBLICATIONS

Uefi Platform Initialization Specification Version 1.3, Vols. 1 and 5, Mar. 29, 2013.*

*Primary Examiner* — Jaweed A Abbaszadeh
*Assistant Examiner* — Cheri Harrington
(74) *Attorney, Agent, or Firm* — Brokaw Patent Law PC; Christopher J. Brokaw

(57) ABSTRACT

Approaches for firmware-based runtime operating system switch. UEFI firmware receives a request to switch an active operating system on a device from a first operating system to a second operating system. The UEFI firmware changes the operational state of the first operating state to an ACPI S3 state. The UEFI firmware performs a set of ACPI S3 resume boot path operations on the second operating system to cause the second operating system to become the active operating system. The set of ACPI S3 resume boot path operations may be performed while the second operating system is loaded into a memory area inaccessible to the first operating system and the first operating system remains in the ACPI S3 state.

15 Claims, 9 Drawing Sheets

(56) References Cited

U.S. PATENT DOCUMENTS

| | | | |
|---|---|---|---|
| 2014/0136799 A1* | 5/2014 | Fortin | G06F 12/0837 711/152 |
| 2014/0304542 A1* | 10/2014 | Rogers | G06F 1/28 713/340 |
| 2015/0113257 A1* | 4/2015 | Lewis | G06F 9/4806 713/1 |
| 2015/0268968 A1* | 9/2015 | Siddiqi | G06F 9/4406 713/2 |
| 2015/0347155 A1* | 12/2015 | Rothman | G06F 9/441 713/2 |
| 2016/0055030 A1* | 2/2016 | Kanai | G06F 9/485 710/6 |

* cited by examiner

| Current State | Current OS Status | User Action | New State | New OS Status |
| --- | --- | --- | --- | --- |
| 00h | S5 | Power On | 01h | S0 |
| 01h | S0 | Sleep | 02h | S3 |
| 02h | S3 | S3 Resume | 01h* | S0 |
| 02h | S3 | S4 timer | 03h | S4 |
| 01h | S0 | Hibernate | 03h | S4 |
| 03h | S4 | S4 Resume | 01h* | S0 |
| 01h | S0 | Reboot | 01h | S0 |
| 01h | S0 | Shutdown | 00h | S5 |

FIG. 1

| State 205 | Primary OS Current Status 210 | Secondary OS Current Status 215 | User Action 220 | New State 225 | Primary OS New Status 230 | Secondary OS New Status 235 | Comment 240 |
|---|---|---|---|---|---|---|---|
| 00 | S5 | S5 | Power On | 01 | S0 | S5 | |
| 01 | S0 | S5 | Reboot | 01 | S0 | S5 | |
| 01 | S0 | S5 | Suspend | 02 | S3 | S5 | |
| 01 | S0 | S5 | Hibernate | 03 | S4 | S5 | |
| 01 | S0 | S5 | Shutdown | 00 | S5 | S5 | |
| 01 | S0 | S5 | OS Switch | 04 | S3* | S0 | |
| 02 | S3 | S5 | S3 Resume | 01 | S0 | S5 | Primary OS intact |
| 02 | S3 | S5 | Hibernate (S4 timer) | 03 | S4 | S5 | |
| 03 | S4 | S5 | S4 Resume | 01 | S0 | S5 | Primary OS intact |

FIG. 2A

| State | Primary OS Current Status | Secondary OS Current Status | User Action | New State | Primary OS New Status | Secondary OS New Status | Comment |
|---|---|---|---|---|---|---|---|
| 04 | S3* | S0 | Reboot | 04 | S3* | S0 | Soft reset |
| 04 | S3* | S0 | Suspend | 05 | S3* | S3 | |
| 04 | S3* | S0 | Hibernate | Invalid request, need warning by OS application* | | | |
| 04 | S3* | S0 | Shutdown | 01 | S0 | S5 | Primary OS intact |
| 04 | S3* | S0 | OS Switch | 06 | S0 | S3* | |
| 05 | S3* | S3 | S3 Resume | 04 | S3* | S0 | |
| 05 | S3* | S3 | Hibernate (S4 timer) | Invalid request, need warning by OS application* | | | |
| 06 | S0 | S3* | Reboot | 06 | S0 | S3* | |
| 06 | S0 | S3* | S4 Resume | 07 | S3 | S3* | |
| 06 | S0 | S3* | Hibernate | Invalid request, need warning by OS application* | | | |
| 06 | S0 | S3* | Shutdown | 08 | S5 | S0 | |
| 06 | S0 | S3* | OS Switch | 04 | S3* | S0 | |

FIG. 2B

| State 205 | Primary OS Current Status 210 | Secondary OS Current Status 215 | User Action 220 | New State 225 | Primary OS New Status 230 | Secondary OS New Status 235 | Comment 240 |
|---|---|---|---|---|---|---|---|
| 07 | S3 | S3* | S3 Resume | 06 | S0 | S3* | Soft reset |
| 07 | S3 | S3* | Hibernate (S4 timer) | Invalid request, need warning by OS application* | | | |
| 08 | S5 | S0 | Reboot | 08 | S5 | S0 | |
| 08 | S5 | S0 | Suspend | 09 | S5 | S3 | |
| 08 | S5 | S0 | Hibernate | 10 | S5 | S4 | ** |
| 08 | S5 | S0 | Shutdown | 00 | S0 | S5 | |
| 08 | S5 | S3 | OS Switch | 06 | S0 | S3* | |
| 09 | S5 | S3 | S3 Resume | 08 | S5 | S0 | |
| 09 | S5 | S3 | Hibernate (S4 timer) | 10 | S5 | S4 | ** |
| 10 | S5 | S4 | S4 resume | 08 | S5 | S0 | ** |

FIG. 2C

FIRMWARE BASED RUNTIME OPERATING SYSTEM SWITCH

CLAIM OF PRIORITY

This application claims priority to U.S. Patent Provisional Application No. 62/044,756, filed on Sep. 2, 2014, entitled "Efficient Switching of Operating Systems on a Device," the disclosure of which is hereby incorporated by reference in its entirety for all purposes as if fully set forth herein.

FIELD OF THE INVENTION

Embodiments of the invention relate to approaches for firmware to facilitate switching between operating systems during the runtime of the firmware.

BACKGROUND

Modern computer systems may be installed with more than one operating system. A common approach for changing which operating system is running on the computer system involves deciding which operating system to load at the time of booting or powering on of the computer system. For example, when a computer system is initially booted, the firmware may allow the user to choose which operating system installed on the computer system is loaded. If, after booting the computer system, the user wishes to use a different operating system, then the user would perform a hard reboot or a soft reboot of the computer system so that the user can make a different selection of which operating system to load. Many users are frustrated with a need to power down their computer system to use another operating system due to both the time and disruption involved.

Other approaches for using two or more operating systems on a single computer system involve the use of virtualized environments in which multiple operating system run simultaneously in isolated computing environments, such as a virtual machine, on a single computer system. A disadvantage of this approach is that virtualizing operating systems in this manner is quite taxing on the CPU and requires the utilization of a large amount of computer system resources.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 1 is a table illustrating a state machine for a single operating system according to an embodiment of the invention;

FIGS. 2A-C are tables illustrating state transitions for a state machine for a system comprising a primary operating system and a secondary operating system according to an embodiment of the invention;

DETAILED DESCRIPTION OF THE INVENTION

Approaches for a firmware-based runtime operating system switch are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

As used herein, the term "primary operating system" refers to the first operating system booted by a computer system. The term "secondary operating system," as used herein, refers to any alternate operating system available on the computer system besides the primary operating system. Note that a computer system may have one or more secondary operating systems.

As used herein, the term "active operating system" refers to the current operating system executing on a computer system that is visible to the user. The active operating system can either be the primary operating system or a secondary operating system depending on the actions of the user. The term "background operating system," as used herein, refers to an operating system executing on a computer system that is not visible to the user. For example, a background operating system may be in ACPI S3 state (a sleep state) which his not currently outputting video data to monitor or other such display device. A background operating system can either be the primary operating system or a secondary operating system depending on the actions of the user.

Functional Overview

The Unified Extensible Firmware Interface Forum (the "UEFI Forum") is an alliance between several leading technology companies to modernize the booting process by use of the Unified Extensible Firmware Interface (UEFI) protocol. Embodiments of the invention are directed towards firmware that conforms to the (Unified Extensible Firmware Interface (UEFI) protocol. The UEFI firmware of an embodiment facilitates the switching of an active operating system from one operating system to a different operating system. In an embodiment, the UEFI firmware may switch which operating system is active by placing the active operating system in an ACPI S3 state and making a particular background operating system selected by the user the new active operating system.

Figure 4:
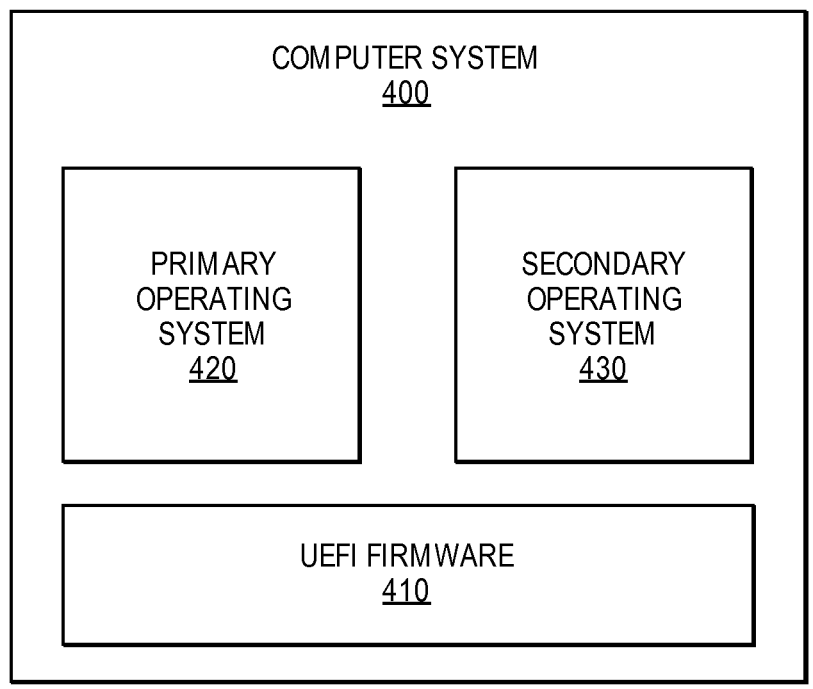
FIG. 4 is a block diagram of system according to an embodiment of the invention.

FIG. 4 is a block diagram of system according to an embodiment of the invention. Embodiments of the invention support UEFI firmware 410 facilitating the loading of secondary operating system 430 into memory of computer system 400 by primary operating system 420. UEFI firmware 410, primary operating system 420, and secondary operating system 430 may execute on computer system 400; a computer system of an embodiment is described in more detail below with reference to FIG. 7. After the primary and at least one secondary operating system has been loaded into memory of computer system 400, active and background operating systems may be switched on-the-fly during the runtime phase of UEFI firmware 410.

A user may issue a request (termed "an OS switch request") to UEFI firmware 410 to request that UEFI firmware 410 switches the active operating system to a different operating system. Further, UEFI firmware 410 of an embodiment provides enhanced power management handling for ACPI states S3, S4, S5 and for handling reboot operations with respect to active and background operating systems. Also, UEFI firmware 410 of an embodiment provides careful management of an OS switch request when the primary operating system is "off." Additional details and features of embodiments shall be described in further detail below.

Changing State

The state of an operating system is often identified using a set of states defined by an Advanced Configuration and Power Interface (ACPI) specification. The ACPI states are well-known to those in the art. To illustrate how ACPI states operate in practice, it will be helpful to review the state machine for a single operating system, such as that depicted in the table of FIG. 1.

FIG. 1 depicts a set of ACPI states (S0-S5) in column 110. Each ACPI state shown in column 110 is associated with a particular current state in column 105. The particular user action taken while at a particular state of the state diagram determines the next state of the state diagram. For example, column 115 depicts possible user actions available at a current state (column 105) of the state diagram. If the user causes the operating system to sleep when the operating system is at state 01h (or ACPI state S0), then the state of the state machine transitions to state 02h as shown in column 120 (which is also ACPI state S3 as shown in column 130. Alternately, if the user causes the operating system to hibernate when the operating system is at state 01h (or ACPI state S0), then the state of the state machine transitions to state 03h as shown in column 120 (which is also ACPI state S4 as shown in column 130.

Figure 3:
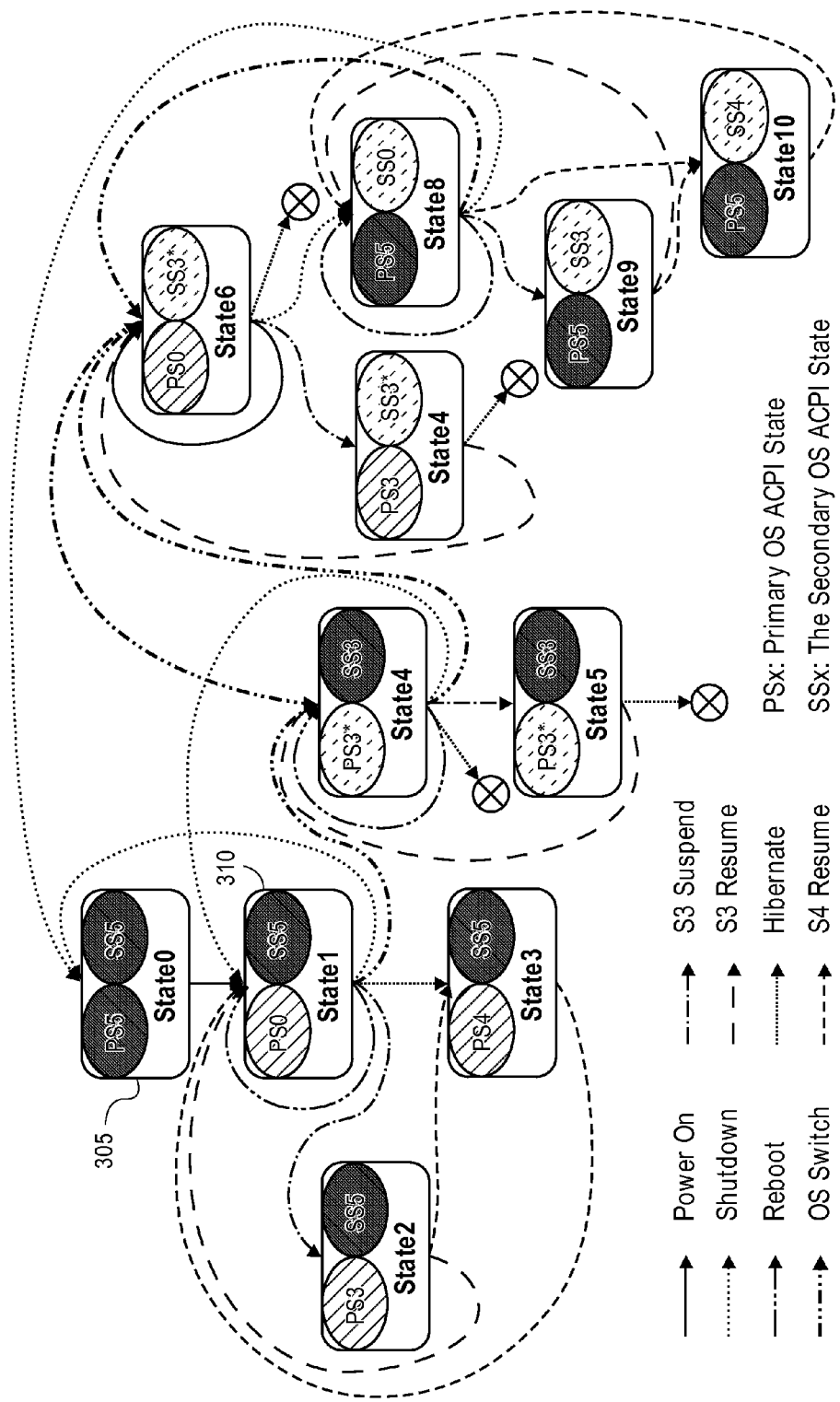
FIG. 3 is a state diagram for a system comprising a primary operating system and a secondary operating system according to an embodiment of the invention.

When two or more operating systems operate on the same computer system, the transition to a new state in the state machine becomes more complex as it is based on the state of both the active and background operating systems. To illustrate this point, consider FIGS. 2A-2C, which are tables illustrating a state machine for a primary operating system and a secondary operating system according to an embodiment of the invention. Note that FIGS. 2A-2C depict rows of a single table describing a state diagram. FIG. 3 is a graphical depiction of the state diagram described in FIGS. 2A-2C according to an embodiment of the invention.

In FIGS. 2A-2C, the state shown in column 205 corresponds to a state shown in FIG. 3 and represents the current state prior to transitioning to a new state in response to a user action. For example, the value of column 205 in the first row shown in the table of FIG. 2A is 0, which corresponds to state 0 shown in node 305 of FIG. 3. As another example, the second row shown in the table of FIG. 2A is state 1, which corresponds to state 1 shown in node 310 of FIG. 3. Columns 210 and 215 depict the ACPI state of the primary and secondary operating systems before transitioning to a new state in response to a user action, column 220 depicts the particular user action causing the state transition, and columns 230 and 235 depict the ACPI state of the primary and secondary operating systems after transitioning to a new state in response to a user action. The state shown in column 225 corresponds to the state shown in FIG. 3 after transitioning to a new state in response to performing a user action. For example, the value of column 225 in the first row shown in the table of FIG. 2A is 1, which corresponds to state 1 shown in node 310 of FIG. 3.

As the state machine depicted in FIGS. 2A-C and 3 involves both a primary operating system and a secondary operating system, care must be exercised when transitioning from certain states. If a reboot request, a hibernate request (ACPI S4), or a suspend to disk (ACPI S5) is performed on the active operating system, then the current memory map and the memory content on the background operating system may be lost. As a result, end users could lose their unsaved file contents in the background operating system. To address this concern, certain embodiments may prohibit this state transition or may cause a warning to be displayed to the user.

Column 240 describes some comments and considerations for certain state transitions in the state machine. In column 240 of rows 250 and 255 of FIG. 2A and row 260 of FIG. 2B, a comment of 'primary operating system intact' is provided. This comment means that the memory map and the memory content for the primary operating system is preserved during the state transition associated with that row. For example, row 260 indicates that even if the primary operating system is in ACPI S3 and the secondary operating system is in ACPI S0, and the user performs a shutdown operation, the new state of primary operating system will be ACPI S0 and the new state of the backup operating system will be ACPI S5; consequently, no data maintained in memory of the primary operating system will be lost, i.e., the memory map and the memory content for the primary operating system is preserved.

Certain other state transitions depicted in FIGS. 2A-2C and FIG. 3 will be discussed below in the section "Handling Power Management Requests."

First Os Switch Involving a Specific Example

Figure 5:
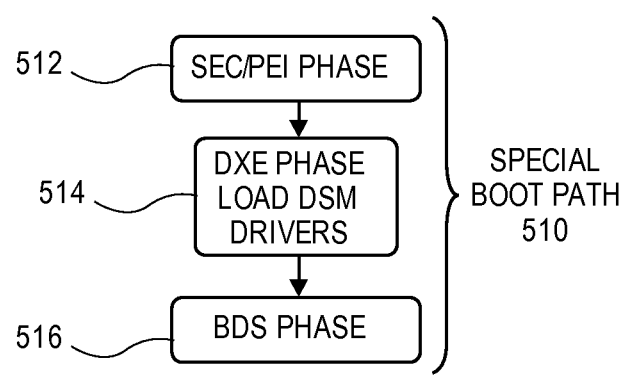
FIG. 5 is a flowchart describing the high level steps of a special boot path performed by a primary operating system in loading a secondary operating system into memory according to embodiments of the invention.

To illustrate how embodiments of the invention may operate when secondary operating system 430 has not yet been loaded into memory, consider FIG. 5, which is a flowchart describing the high level steps of a special boot path performed by a primary operating system in loading a secondary operating system into memory according to embodiments of the invention.

Initially, when a computer system is powered on, primary operating system 420 is loaded into memory of computer system 400. At this point in time, primary operating system 420 has been loaded into memory but secondary operating system 430 has not yet been loaded into memory. As a result, if an OS switch request is received by UEFI firmware 410 when secondary operating system 430 has not yet been loaded into memory, then a special boot path 510 is performed by UEFI firmware 410 to load secondary operating system 430 into memory that is not visible to primary operating system 420.

Initially in an embodiment, UEFI firmware 410 places the primary operating system 420 in an ACPI S3 state. UEFI firmware 410 may update an OS switch flag to indicate that the OS switch request has been received. UEFI firmware 410 may also set a timer for some time period (for example, one second) to indicate when to proceed with special boot path 510 in FIG. 5.

After the expiration of the timer if a value is set (the time is operational and need not be used in all embodiments), UEFI firmware 410 performs special boot path 510 of FIG. 5. Initially, UEFI firmware 410 (in step 512) performs SEC/PEI phase operations of an ACPI S3 resume. The PEI code detects that the OS switch flag has been set, thereby indicating that an OS switch request has been received. The PEI code would then identify that secondary operating system 430 has not yet been loaded into memory of computer system 400. Thus, instead of proceeding with a full ACPI S3 resume operation of secondary operating system 430, UEFI firmware 410 performs the remaining PEI phase by (a) restoring minimal hardware configuration and memory configurations using an ACPI S3 restore operation and (b) performs a DXEIPL save resume vector operation and passes control to the DXE phase.

In the DXE phase (step 514), UEFI firmware 410 loads a minimal set of drivers for loading secondary operating system 430. Such drivers may include the core and basic architecture drivers and the I/O related drivers that could be used later for operating system loading including video, keyboard, and BlockIO (SATA). The memory map for secondary operation system 430 excludes any memory regions that primary operating system 420 has used. Thereafter, in the DBS phase (step 516), the bootloader of secondary operating system 430 is used to boot secondary operating system 430.

As a result of these steps, secondary operating system 430 is now the active operating system and primary operating system 420 is not the background operating system. Henceforth, the active operating system may be switched between the primary and secondary operating systems by performing the steps of FIG. 6 described below.

Firmware-Based Runtime Os Switch

Figure 6:
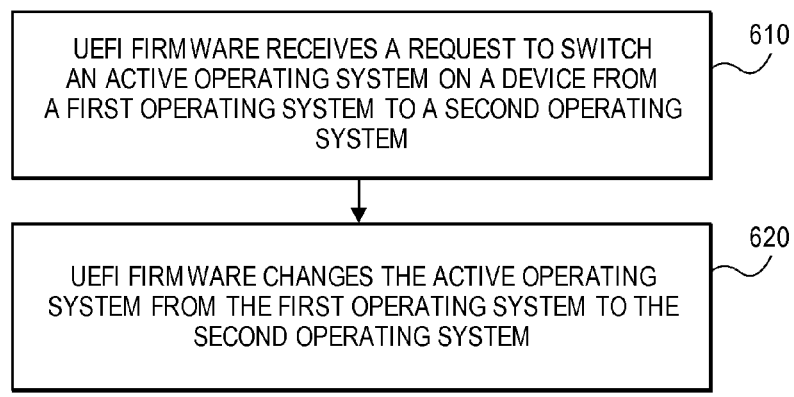
FIG. 6 is a flowchart illustrating the functional steps performed by an embodiment of the invention.

FIG. 6 is a flowchart illustrating the functional steps performed by an embodiment of the invention. The steps of FIG. 6 may be performed by UEFI firmware 410 to dynamically switch the active operating system between a first operating system and a second operating system. Note that the steps of FIG. 6 presume that the second operating system (which is to become the active operating system after the switch) is already loaded into memory.

In step 610, UEFI firmware 410 receives a request (an "OS switch request") to switch an active operating system on a device from a first operating system (which is currently active) to a second operating system (which is not currently active). In an embodiment, the OS switch request may originate from the first operating system or an application executing on the first operating system. As an example, an icon may be displayed on the desktop of the first operating system. The icon, when selected by the user, may send the OS switch request of step 610 to the UEFI firmware 410 or may expose a user interface through which the OS switch request of step 610 may be initiated by a user. In another embodiment, the OS switch request may originate from a user interface exposed by UEFI firmware 410. In such a case, a user may directly instruct UEFI firmware 410 using the user interface exposed by the UEFI firmware 410 to perform the OS switch request of step 610.

In step 620, UEFI firmware 610 changes the operational state of the first operating state (which is the active operating system) to an ACPI S3 state. Thereafter, UEFI firmware 410 performs a set of ACPI S3 resume boot path operations on the second operating system while the second operating system is loaded into a memory area inaccessible to the first operating system and the first operating system remains in the ACPI S3 state.

In an embodiment of the invention, in performing step 620, UEFI firmware 410 changes the operational state of the first operating state (which is currently active) to an ACPI S3 state. UEFI firmware 410 may update an OS switch flag to indicate that the OS switch request of step 610 has been received. UEFI firmware 410 may also set timer for some time period (for example, one second) to indicate when to proceed. After the expiration of the timer if a value is set (the timer need not be used in all embodiments), UEFI firmware 410 performs an ACPI S3 resume operation, including the SEC phase and the PEI phase. During the PEI phase, the UEFI firmware detects that the OS switch flag has been set and identifies that the second operating system has already been loaded into memory. Instead of continuing with normal ACPI S3 resume operations, an alternate ACPI S3 resume path is performed. The alternate ACPI S3 resume path is all handled in the PEI phase.

During the alternate ACPI S3 resume path, UEFI firmware 410 restores minimal hardware configuration and memory configuration using an ACPI S3 restore operation. The UEFI firmware switches the current active operating system bootscript pointing to the background operating system, control is passed to DXEIPL, and the resume vector is switched to the background operating system saved in the previous ACPI S3 path. As both the bootscript and resume vector point to the background operating system but not the active operating system, UEFI firmware 410 will restore the configuration of the background operating system and switch the background operating system as the active operating system.

Handling Power Management Requests

In an embodiment, when both primary operating system 420 and any secondary operating systems 430 are running, and the active operative system is requested to be placed into an ACPI S3 state, UEFI firmware 410 places the active operating system into the ACPI S3 state but does not automatically change the active operating system to be a secondary operating system. In other words, UEFI firmware 410 will not interpret a request to place the active operating system into the ACPI S3 state as an OS switch request. UEFI firmware 410 may resume an active operating system placed into an ACPI S3 state when a resume operation is requested to be performed on the active operating system.

In an embodiment, in the case when both the primary operating system and any secondary operating systems are running, and the active operative system is requested to be rebooted or placed into an ACPI S4 or S5 state, UEFI firmware 410 allows the user to make a decision as to how to handle the background operating system instead of automatically performing the requested action on the active operating system without any consideration of the background operating system.

If user input is not available or not provided in a timely fashion, in another embodiment, if both the primary operating system and any secondary operating systems are running and the active operative system is requested to be placed into an ACPI S4 or S5 state, UEFI firmware 410 intercepts and hooks a S4 and S5 sleep trap after the active operating system issues ACPI S4 or S5 command. Thereafter, UEFI firmware 410 issues an ACPI S3 command on the active operating system and initiates a resume timer to indicate when UEFI firmware 410 should issue an ACPI S3 resume command on the active operating system. Thus, rather than the active operating system being placed into an ACPI S4 or S5 state, UEFI firmware 410 automatically places the active operating system into an ACPI S3 state and thereafter performs a ACPI S3 resume operation on the active operating system.

If user input is not available or not provided in a timely fashion, in another embodiment, if both the primary operating system and any secondary operating systems are running and the active operative system is requested to be rebooted, UEFI firmware 410 enables a I/O trap for the reset port (port 60*h*/64*h* or other I/O) or may hook into/use the UEFI Reset Protocol to intercept a reboot request from the active operating system. Thereafter, UEFI firmware 410 issues an ACPI S3 command on the active operating system and initiates a resume timer to indicate when UEFI firmware 410 should issue an ACPI S3 resume command on the active operating system. Thus, rather than rebooting the active operating system, UEFI firmware 410 automatically places the active operating system into an ACPI S3 state and thereafter performs a ACPI S3 resume operation on the active operating system.

Handling an Operating System Switch when the Primary Operating System is not Available When primary operating system 420 is not available due to being rebooted or placed into an ACPI S4 and S5 state, the performance of an OS switch request received by secondary operating system 430 needs to be exercised carefully. In an embodiment, UEFI firmware 410 checks the state of the current active operating system prior to switching to a new active operating system.

If an OS switch request is received when primary operating system 420 is in an ACPI S5 state or is being rebooted, then primary operating system 420 is reloaded from secondary operating system 430. In an embodiment, to do so, UEFI firmware 410 places the secondary operating system in an ACPI S3, asserts an OS switch flag, and initiates a resume clock with some value (such as one second). After the expiration of the resume clock, UEFI firmware 410 performs SEC/PEI phase operations of an ACPI S3 resume operation. The PEI code detects that the OS switch flag has been set, thereby indicating that an OS switch request has been received. The PEI code would then identify that primary operating system 420 is in an ACPI S5 state or is being rebooted. Thus, instead of proceeding with a full ACPI S3 resume operation, UEFI firmware 410 performs the remaining PEI phase by (a) restoring minimal hardware configuration and memory configurations using an ACPI S3 restore operation and (b) performs a DXEIPL save resume vector operation and passes control to the DXE phase.

In the DXE phase, UEFI firmware 410 loads a minimal set of drivers for loading primary operating system 420. Such drivers include core and basic architecture drivers, I/O related drivers that could be used later for operating system loading including video, keyboard, and BlockIO (SATA). The memory map for primary operating system 420 excludes any memory regions that secondary operating system 430 has used. Thereafter, in the DBS phase, the BDS boots primary operating system 420.

Alternately, if an OS switch request is received when primary operating system 420 is in an ACPI S4 state, then due to the potential failure of primary operating system 420 if an ACPI S4 resume operation is performed, the OS switch request will be aborted by an embodiment. The OS switch request may be aborted because secondary operating system 430 is still active and reloading primary operating system 420 using the modified booting procedures discussed above will generate a different memory map compared to a normal boot, which will cause the ACPI S4 resume operation of primary operating system 420 to fail as well as result in potential data loss. Instead, a message may be displayed to the user that the OS switch request cannot be performed given the risk of data loss and may instruct the user to reboot if the user wishes to proceed.

Row 265 of FIG. 2B and row 285 of FIG. 2C depicts a state transition involving a soft reboot. For the state transition depicted by row 265, note that there is no change of state in the soft reset, as columns 205 and 225 both depict the same state in for row 265. With respect to row 285 of FIG. 2C, note that there is a change of state, as the primary operating system is initially in an ACPI S3 state, a S3 resume operation is performed, and consequently the primary operating system resumes operation in the ACPI S0 state.

In an embodiment, UEFI firmware 410 may coordinate with an application executing on the active operating system to display a warning message prohibiting or displaying a warning about a particular state transition. In particular, in embodiments of the invention, the state transitions associated with rows 270, 275, 280, and 290 may be treated in this manner.

In an embodiment, to promote certain consistent ACPI S4 behavior, certain state transitions may be blocked or prohibited. In particular, in embodiments of the invention, the state transitions associated with rows 292, 294, and 296 may be blocked or prohibited.

Hardware Mechanisms

Figure 7:
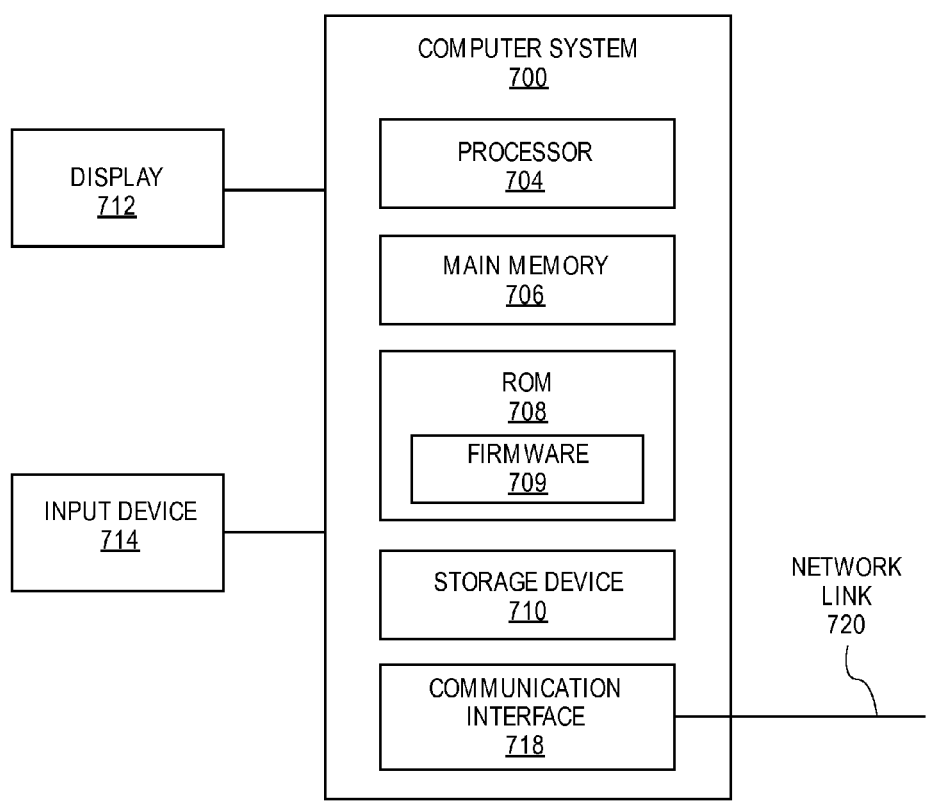
FIG. 7 is a block diagram that illustrates the hardware components of a computer system upon which an embodiment of the invention may be implemented.

FIG. 7 is a block diagram that illustrates a computer system 700 upon which an embodiment of the invention may be implemented, such as computer system 400 of FIG. 4. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704.

Computer system 700 further includes a read only memory (ROM) 708 or other static storage device for storing static information and instructions for processor 704. ROM 708 may store UEFI firmware 709 in an embodiment. A storage device 710, such as a magnetic disk, optical disk, or flash drive, is provided for storing information and instructions.

Computer system 700 may be coupled to a display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments of the invention may include any number of input devices 714 coupled to computer system 700.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for a firmware-based runtime operating system switch, which when executed by one or more processors, cause:

upon firmware receiving a request to switch an active operating system on a device from a first operating system to a second operating system, the firmware changing an operational state of the first operating system to an ACPI S3 state and performing a set of ACPI S3 resume boot path operations on the second operating system to cause the second operating system to become the active operating system, wherein the ACPI S3 state is a sleep state; and upon receiving a request to place said active operating system into a ACPI S4 state or a ACPI S5 state, forbearing any change in an operational state of said active operating system until user input regarding how to handle a background operating system is received, wherein the ACPI S4 state is a hibernation state, and wherein the ACPI S5 state is a suspend to disk state.

2. The one or more non-transitory machine-readable storage mediums of claim 1, wherein said set of ACPI S3 resume boot path operations are all handled in a Pre-EFI Initialization (PEI) phase.

3. The one or more non-transitory machine-readable storage mediums of claim 1, wherein said set of ACPI S3 resume boot path operations includes:

adjusting a current active operating system bootscript point to reference an operating system bootscript for the second operating system; and adjusting a current resume vector to reference a resume vector for the second operating system.

4. The one or more non-transitory machine-readable storage mediums of claim 1, wherein execution of the one or more sequences of instructions further cause:

upon receiving a request to place said active operating system into said ACPI S3 state, placing said active operating system in said ACPI S3 state without changing said active operating system to a different operating system.

5. The one or more non-transitory machine-readable storage mediums of claim 1, wherein performing said set of ACPI S3 resume boot path operations on the second operating system is performed while (a) the second operating system is loaded into a memory area inaccessible to the first operating system and (b) the first operating system remains in the ACPI S3 state.

6. An apparatus for a firmware-based runtime operating system switch, comprising:

one or more processors; and one or more non-transitory computer-readable storage mediums storing one or more sequences of instructions, which when executed, cause:

upon-firmware receiving a request to switch an active operating system on a device from a first operating system to a second operating system, the firmware changing an operational state of the first operating system to an ACPI S3 state and performing a set of ACPI S3 resume boot path operations on the second operating system to cause the second operating system to become the active operating system, wherein the ACPI S3 state is a sleep state; and upon receiving a request to place said active operating system into a ACPI S4 state or a ACPI S5 state, forbearing any change in an operational state of said active operating system until user input regarding how to handle a background operating system is received, wherein the ACPI S4 state is a hibernation state, and wherein the ACPI S5 state is a suspend to disk state.

7. The apparatus of claim 6, wherein said set of ACPI S3 resume boot path operations are all handled in a Pre-EFI Initialization (PEI) phase.

8. The apparatus of claim 6, wherein said set of ACPI S3 resume boot path operations includes:

adjusting a current active operating system bootscript point to reference an operating system bootscript for the second operating system; and adjusting a current resume vector to reference a resume vector for the second operating system.

9. The apparatus of claim 6, wherein execution of the one or more sequences of instructions further cause:

upon receiving a request to place said active operating system into said ACPI S3 state, placing said active operating system in said ACPI S3 state without changing said active operating system to a different operating system.

10. The apparatus of claim 6, wherein performing said set of ACPI S3 resume boot path operations on the second operating system is performed while (a) the second operating system is loaded into a memory area inaccessible to the first operating system and (b) the first operating system remains in the ACPI S3 state.

11. A method for a firmware-based runtime operating system switch, comprising:

upon firmware receiving a request to switch an active operating system on a device from a first operating system to a second operating system, the firmware changing an operational state of the first operating system to an ACPI S3 state and performing a set of ACPI S3 resume boot path operations on the second operating system to cause the second operating system to become the active operating system, wherein the ACPI S3 state is a sleep state; and upon receiving a request to place said active operating system into a ACPI S4 state or a ACPI S5 state, forbearing any change in an operational state of said active operating system until user input regarding how to handle a background operating system is received, wherein the ACPI S4 state is a hibernation state, and wherein the ACPI S5 state is a suspend to disk state.

12. The method of claim 11, wherein said set of ACPI S3 resume boot path operations are all handled in a Pre-EFI Initialization (PEI) phase.

13. The method of claim 11, wherein said set of ACPI S3 resume boot path operations includes:

adjusting a current active operating system bootscript point to reference an operating system bootscript for the second operating system; and adjusting a current resume vector to reference a resume vector for the second operating system.

14. The method of claim 11, further comprising:

upon receiving a request to place said active operating system into said ACPI S3 state, placing said active operating system in said ACPI S3 state without changing said active operating system to a different operating system.

15. The method of claim 11, wherein performing said set of ACPI S3 resume boot path operations on the second operating system is performed while (a) the second operating system is loaded into a memory area inaccessible to the first operating system and (b) the first operating system remains in the ACPI S3 state.

\* \* \* \* \*